United States Patent [19]

Cooley et al.

[11] Patent Number: 5,580,591
[45] Date of Patent: Dec. 3, 1996

[54] SYSTEM AND METHOD OF PROOFING PRE-PACKAGED DOUGHS

[75] Inventors: Timothy R. Cooley, New Albany, India.; Sholeh Chatraei, Fridley, Minn.

[73] Assignee: The Pillsbury Company, Minneapolis, Minn.

[21] Appl. No.: 402,802

[22] Filed: Mar. 13, 1995

Related U.S. Application Data

[63] Continuation of Ser. No. 954,117, Sep. 30, 1992, abandoned.

[51] Int. Cl.$^6$ .................................................. A21D 10/02
[52] U.S. Cl. .................................................. 426/8; 426/128
[58] Field of Search .............................. 426/8, 128, 107, 426/412, 19, 90, 100, 394 R

[56] References Cited

U.S. PATENT DOCUMENTS

| | | | |
|---|---|---|---|
| 1,985,904 | 1/1935 | Murch | 426/403 |
| 3,438,791 | 4/1969 | Matz . | |
| 3,807,057 | 4/1974 | Noel | 34/237 |
| 4,120,984 | 10/1978 | Richardson et al. | 426/128 X |
| 4,549,072 | 10/1985 | Brist et al. | 219/400 |
| 4,792,456 | 12/1988 | Katz et al. . | |
| 4,917,914 | 4/1990 | Katz et al. . | |
| 4,927,991 | 5/1990 | Wendt et al. | 426/107 X |
| 5,078,050 | 1/1992 | Smith | 99/483 |
| 5,084,284 | 1/1992 | McDilda et al. | 426/128 |

FOREIGN PATENT DOCUMENTS

| | | |
|---|---|---|
| 571265 | 2/1933 | Germany . |
| 576302 | 4/1933 | Germany . |
| 1501322 | 12/1969 | Germany . |

*Primary Examiner*—Frank Spear
*Attorney, Agent, or Firm*—Edward Hotchkiss; Aleya Rahman

[57] ABSTRACT

A method of proofing packaged dough comprising providing a case have aligned orifices in the top and bottom walls and placing plural packages containing substantially unproofed, unbaked dough in the case in abutting fashion. The case is placed in a heating chamber to uniformly heat all the packages and then it is cooled to refrigeration temperature.

4 Claims, 2 Drawing Sheets

SYSTEM AND METHOD OF PROOFING PRE-PACKAGED DOUGHS

This application is a continuation of application Ser. No. 07/954,117, filed Sep. 30, 1992, now abandoned.

FIELD OF THE INVENTION

The present invention provides a system and a method for proofing and cooling pre-packaged doughs, and finds particular application in the field of pre-packaged refrigeratable doughs.

BACKGROUND OF THE INVENTION

A wide variety of commercially produced doughs are sold on the market today. Most prepared doughs are either intended to be frozen until a consumer is ready to use them or prepared for refrigerated storage. Frozen doughs are packaged in an unleavened state and a consumer must thaw out the dough and permit it to "rise" before baking. This thawing and leavening can be time consuming.

Refrigerated doughs, on the other hand, are most commonly leavened during the manufacturing process. This permits consumers to simply open the package of dough and immediately bake the dough. The convenience of refrigerated doughs as compared to frozen doughs makes refrigerated doughs more appealing to many consumers.

Refrigerated doughs are normally sold in individual containers providing a quantity of a dough to bake a single loaf of bread, a single batch of biscuits, etc. These containers are most commonly substantially cylindrical in shape and are formed of a pair of ends, which may be formed of a metal, attached at opposite ends of a tubular sidewall, which is frequently formed of a metal, paper and plastic composite.

In making such dough products, the manufacturer commonly places a predetermined portion of a substantially unleavened dough in the package and then leavens, or "proofs", the dough within the package. This has been found to be easier than proofing a large batch of dough and trying to place the leavened dough in a package without damaging the dough.

Proofing is most advantageously carried out at elevated temperatures, e.g. on the order of about 95° F. This promotes the reaction of the chemicals in the leavening agent to ensure that the dough is reproducibly leavened in a predetermined period of time. The individual packages of unleavened dough may be individually heated during the proofing stage and the proofed packages may be packed later into cases (most commonly cardboard boxes containing a predetermined number, e.g. 24, of dough packages) for shipping. This methods proves to be rather costly and inefficient, though. It has been found much more economical to pack the dough packages into the cases in which they are sold prior to proofing and then proof the dough within the case.

Although packing the dough products into cases prior to proofing is more economical than proofing the dough packages one at a time, it is not without its flaws. As noted above, cases generally contain a number of packages of dough and are formed of cardboard or the like. Some of the dough packages will be positioned adjacent an exterior wall of the case while other dough packages are toward the center of the case and are spaced away from the sidewall. During the proofing process, the cases of unleavened dough are generally held in a controlled temperature environment which supplies convective heat to the case. The packages closer to a sidewall of the case will therefore tend to heat up to the desired temperature more quickly than the containers in the middle of the case.

This means that the manufacturer must leave the case in the controlled temperature environment for a longer period of time in order to ensure that all of the dough reaches the necessary temperature and stays at that temperature for the appropriate length of time. For example, a case of dough may take from about 50 minutes to about two hours in a 95° F. environment, depending on the particular dough product, before all of the dough is sufficiently proofed; the same dough can be proofed in about 30 minutes to about 50 minutes if the cans are proofed individually.

In order to cool cases of proofed dough, the cases of hot dough are commonly placed in a holding area maintained at a reduced temperature, e.g. 38°–40° F., to chill the dough and arrest the leavening process. The dough will commonly continue to rise until the temperature of the dough drops below about 45° F. This permits the dough to leaven further when the dough is baked so the product will rise in the oven.

The containers adjacent the walls of a case will tend to cool more quickly than the containers in the interior of the case. Thus, a significantly longer period of time must be allowed to cool all of the dough to refrigeration temperatures for storage and shipping than would be necessary if each container were proofed and cooled individually.

This difference in the heat treatment of dough depending on its position in a case introduces some variability in the quality of the product. Even though all of the dough products in a case may include dough formed in the same batch and be packaged in an identical manner, the packages adjacent the walls of the case will be held at an elevated temperature for a longer period of time and will be heated and cooled more quickly than will the inner packages, resulting in uneven proofing conditions for different packages within a single case.

In present manufacturing techniques, cases filled with packaged dough products as described above are frequently arranged on pallets and these pallets are passed through a heated chamber to heat the dough. Although this further simplifies handling of the dough products, it also adds to the disparity in proofing conditions from one package of dough to the next.

As explained above, temperature differentials arise within a case between those packages closest to the exterior of the case and those more centrally positioned within the case. The same problem tends to arise when these cases are arranged on a pallet—those cases closer to the perimeter of the pallet will heat and cool more quickly than the cases toward the center of the pallet. Accordingly, heating dough products which are packed into cases introduces some variation in proofing conditions for dough products depending upon their position within the case and packing those cases on a pallet will add even greater variability to the proofing process from one dough product to the next. Since cases may be stacked atop one another on a pallet, this can further compound the problem in that some of the cases on a pallet will be entirely surrounded by other cases. Hence, the proofing conditions experienced by dough in a package adjacent a sidewall of a case positioned peripherally on a pallet will differ significantly from the conditions experienced by dough in a package toward the center of the centermost case on a pallet.

One other problem with the current mode of proofing dough products is that it takes much longer than comparable proofing of individual packages of dough. As explained above, the innermost dough packages will take longer to reach the target temperature and will take significantly longer to cool to refrigeration temperatures. This will obviously affect processing times of the dough, forcing a manufacturer to leave a pallet of dough products in the heating tunnel for a longer period of time, and to spend more time cooling the dough to arrest leavening, than would otherwise be necessary to proof or cool individual packages of dough.

As an example, proofing of a pallet containing cases of substantially unleavened dough products must generally be heated in a chamber maintained at about 95° F. for at least about 50 minutes, and perhaps as long as about 2 hours; this time will depend on the product, the number of cases on the pallet (which may range from about 70 cases to over 400 cases, depending on the size of the case) and the degree of leavening desired. Cooling this same pallet by placing it in a cooled storage area maintained at about 38°–40° F. can take as long as a week, with leavening continuing until the temperature is low enough to arrest the process, which can be as long as 2 days. If the same dough packages were individually heated and cooled under the same conditions, proofing could be carried out in about 30 minutes and they would cool to refrigeration temperatures in about 2 hours.

Accordingly, it would be desirable to provide a system for proofing packaged dough products that allow packaged dough products to be uniformly proofed in cases without regard to the relative position of the package within a case or that case's position on a pallet. Furthermore, it would be advantageous to provide a means for rapidly heating the dough in such cases to the desired proofing temperature and rapidly cooling the dough to arrest leavening.

SUMMARY OF THE INVENTION

The present invention provides a means for rapidly and uniformly heating and cooling packages of dough which are packed into cases. Cases of the invention are provided with a plurality of orifices which are optimally sized and positioned to maximize air flow through the cases and contact between heated or cooled air and the packaged doughs. In particular, the invention includes a plurality of generally cylindrical packages of substantially unleavened dough in a case which has a plurality of sidewalls, a top wall and a bottom wall. The top and bottom walls are provided with a plurality of orifices passing through the walls, with the orifices in the top and bottom walls being in substantial alignment with one another. Pairs of aligned orifices on the top and bottom walls define a preferred path of air flow through the case.

In order to maximize air flow through the case, the orifices are positioned such that this preferred path is substantially unobstructed by the dough packages in the case, i.e. the orifices are positioned substantially above and below interstices between the cylindrical dough packages. This will permit an air flow pattern to be established in the container. In a preferred embodiment, no more than about 65%, and optimally no greater than about 60%, of the surface area of the orifices is occluded by the packages of dough in the case. In order to maintain structural integrity of the case, the orifices desirably comprise between about 15 and about 35 percent of the total surface area of the top and bottom walls.

The present invention also provides a method of proofing dough which quickly and uniformly heats the packaged dough within such a case. In this method, a case of the invention is filled with generally cylindrically-shaped packages of substantially unleavened dough. If so desired, a plurality of cases may then be arranged on a pallet. This case, or pallet of cases, is then passed through a heating chamber which directs heated air through the orifices in the case to quickly and substantially uniformly heat the dough. The case (or pallet of cases) remains in the chamber for a specified time before being removed to a cooling area. In a preferred embodiment, the cooling area provides a flow of cooled air which flows through the orifices in the case to quickly and uniformly cool the packaged dough.

DETAILED DESCRIPTION OF THE PREFERRED EMBODIMENTS

Figure 1:
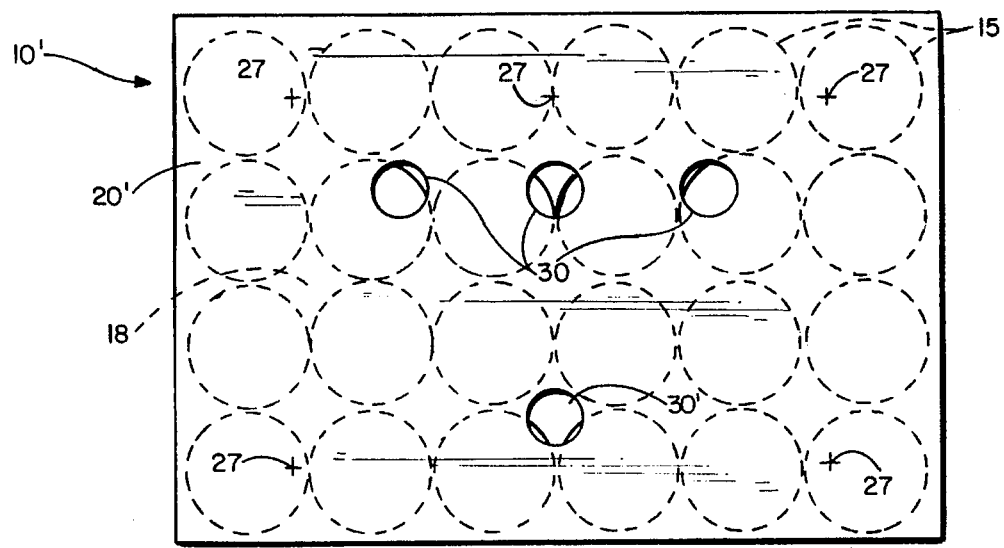
FIG. 1 is a bottom isolation view of a case for packaged dough products in accordance with the prior art.

A case 10 for packaged dough products in accordance with the present invention is shown in FIGS. 2–6 while a case 10' currently in use in manufacturing doughs is shown in FIG. 1. Turning first to the prior art of FIG. 1, the case 10' generally comprises a bottom wall 20', a plurality of sidewalls, and a top wall (not shown). The sidewalls generally extend perpendicularly upwardly from the bottom wall 20', and the top wall is attached to the top edges of these sidewalls and is oriented substantially parallel to the bottom wall. A plurality of packages 15 (shown in phantom lines in this figure) of substantially unleavened dough are arranged within the case 10'. Most refrigeratable doughs are packaged in substantially cylindrical packages and these packages are placed in a case with their cylindrical walls abutting one another, as illustrated in this drawing.

In the embodiment shown in FIG. 1, the bottom wall is provided with several "finger holes" 30' adapted to permit an automated packaging apparatus to more easily manipulate the case for filling. These finger holes are generally relatively small, e.g. on the order of about one inch or less in diameter. The purpose of these holes is solely to permit a case to be handled by automated machinery. The top wall of the container generally is not provided with such holes, but rather is smooth, i.e. without any orifices passing therethrough.

The positioning of the finger holes 30' do not correspond in any significant way to the position of the dough packages 15. This is due to the fact that the position of the finger holes is chosen for the optimal ease of grasping the case rather than to improve the flow of air through the case. As illustrated in FIG. 1, most of the finger holes are substantially occluded by the end of a dough package 15. In this configuration, only about 21 percent of the surface area of the finger holes 30' is positioned adjacent an interstitial space 18 between the packages. Furthermore, the surface area of the finger holes 30' is only about 7 percent of the total surface area of the bottom wall 20', which will not significantly affect the heating and cooling rates of the dough.

One other feature of the case 10' shown in FIG. 1 is worth noting. In particular, the bottom wall 20' of this case is commonly adapted to be handled by "vacuum cups" (not shown). Such vacuum cups are commonly used in current manufacturing processes to open the cases so that they may be filled with dough by placing the cups on the surface of a case and drawing a vacuum within the cup to cause the case to adhere to the cups. The top of the case can then be opened with automated machinery, such as a packaging machine which is commercially available under the name "Duo Dozen." This is important to note in that the areas 25 adapted to be contacted by these cups must be substantially free from perforations; if holes were placed in these cup-receiving areas 25, the cups would not be able to draw a sufficient vacuum to be able to open the case for filling. The centers of these cups, which are commonly generally circular in cross section, are adapted to substantially align with the center marks 27 shown in FIG. 1.

Figure 2:
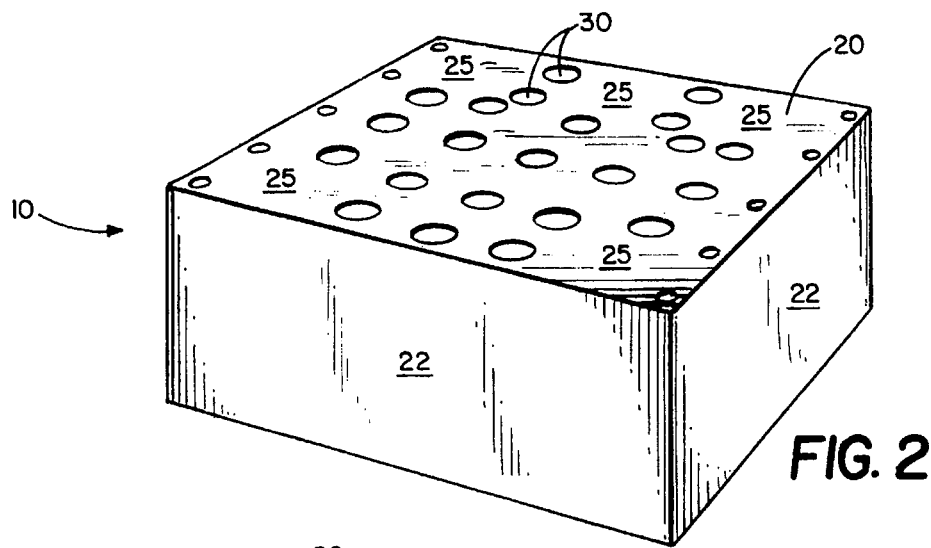
FIG. 2 is a perspective elevational view of a case for packaged dough products in accordance with the present invention.
Figure 3:
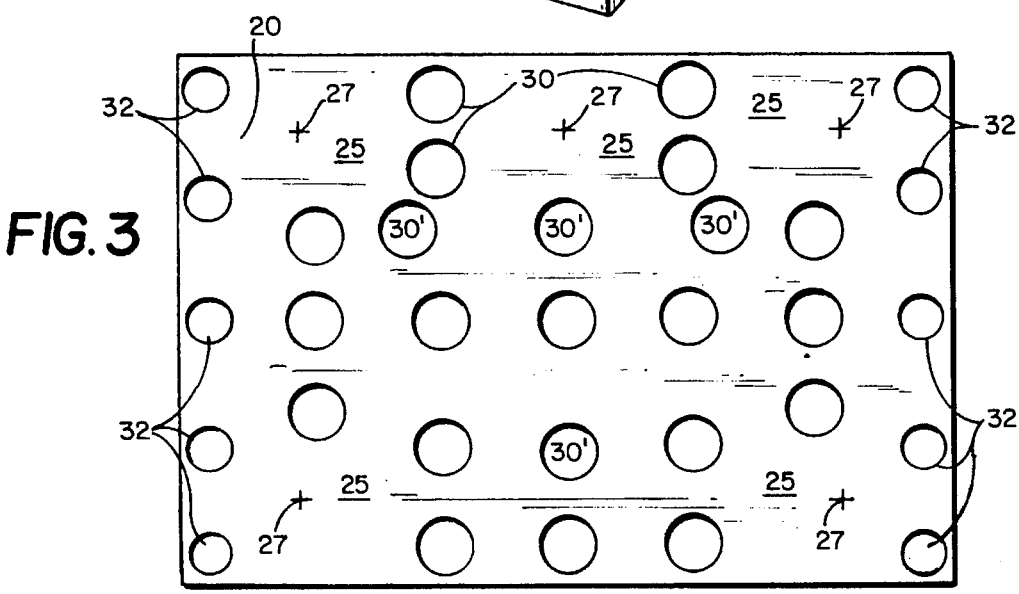
FIG. 3 is a top isolational view of the case of FIG. 2.
Figure 4:
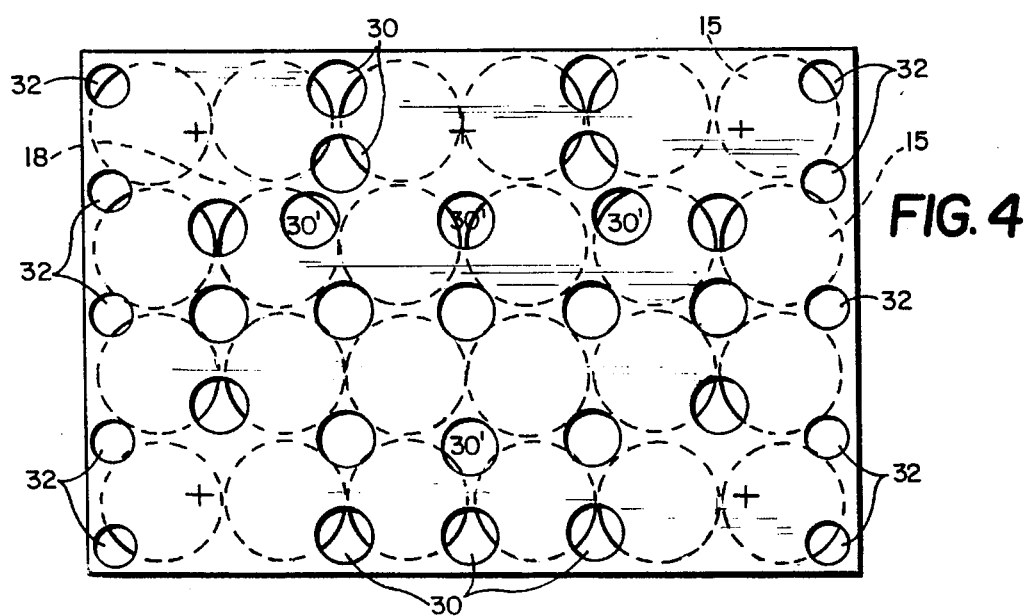
FIG. 4 is a view of the case of FIG. 2 similar to that presented in FIG. 3, but showing the relationship between the orifices in the case and the position of dough packages within the case.

FIGS. 2–4 depict a case 10 according to one embodiment of the present invention. As illustrated in FIG. 2, the case includes a top wall 20, a plurality of side walls 22 and a bottom wall (not shown) which together define an interior of the case. As in the prior art case 10' described above in connection with FIG. 1, the sidewalls 22 may depend generally perpendicularly downwardly from the periphery of the top wall 20 and the bottom wall is attached to the bottoms of the sidewalls generally parallel to the top wall 20. The case shown in this embodiment is generally rectangular in shape in that it includes four sidewalls; it is to be understood, though that this number may be increased or decreased as necessary to accommodate the dough packages 15 stored in the case.

The sidewalls 22 are desirably generally smooth, i.e. without perforations therethrough. This will permit printing or a separate label to be applied to the sidewalls to identify the contents of the case without any interruption by perforations in the wall. As explained in greater detail below, the bottom wall (not shown) is desirably substantially the same as the top wall 20 so that the orifices in the top and bottom walls will be aligned with one another. Accordingly, the drawings of FIGS. 3 and 4 could be characterized as depicting a top view of either the bottom wall or the top wall.

FIG. 3 shows a top view of the case 10 depicted on FIG. 2. The top wall 20 includes a plurality of orifices 30 which are spaced about the surface of this top wall. These orifices pass entirely through the top wall to define a port through which air or other gases may pass into the interior of the container to heat or cool the dough packages 15. The orifices may be of virtually any shape, but is preferred that the orifices in the present embodiment be generally circular, as shown. It may also be helpful for at least most of these orifices to be substantially the same size. In the embodiment shown in FIGS. 2–4, all of the orifices except the edge orifices 32 positioned adjacent the edges of the container are substantially the same size.

The top wall 20 of the invention also retains the finger holes 30' provided in the current case design 10' shown in FIG. 1. These holes are retained in order to minimize any disruption of current manufacturing or handling operations which may otherwise be caused by changes in the design of these cases.

The relative arrangement of the orifices in the top wall 20 and the dough packages 15 in the interior of the case 10 can be seen in FIG. 4. FIGS. 3 and 4 are substantially the same, but FIG. 4 depicts the position of the dough packages 15 within the interior of the case 10. (These packages have been omitted from FIG. 3 for purposes of clarity.) In FIG. 4, it can be seen that, as in the prior art case of FIG. 1, the generally cylindrically-shaped dough packages 15 are arranged to substantially fill the case with the dough packages abutting one another. The abutment of these cylindrical dough packages defines a plurality of interstices 18 therebetween.

FIG. 4 illustrates that most of the orifices 30 through the top wall 20 are adapted to substantially align with the interstices 18 between the dough packages. Accordingly, the orifices in the top wall remain substantially unoccluded by the dough packages. For reasons explained below, this lack of occlusion will permit the dough to be proofed more quickly and uniformly.

It will also be noted that the arrangement of the orifices on the top wall 20 is irregular. If the case 10 of the invention were not intended to be handled by vacuum cups such as those presently used in the art, all of the orifices 30 could be positioned immediately over an interstice 18 between the dough packages, with each interstice being associated with its own orifice. However, the case of the invention is adapted so that the case may be handled with the vacuum cups presently in use in manufacturing operations if so desired; this provides greater flexibility in manufacturing in that the case depicted in FIGS. 2–4 could be used either with or without such vacuum cups.

The need to provide the vacuum cup areas 25 on the top wall 20 of the container, as well as the retention of the finger holes 30', prevents the orifices 30 from being arranged in a uniform, orderly configuration across the entire surface area of the top wall. As shown in FIG. 4, this will prevent orifices from being placed over some of the interstices positioned adjacent the sidewalls of the case. However, the arrangement of the orifices in the top wall has been optimized to ensure the maximum temperature uniformity within the case given the constraints of using a vacuum cup and finger holes such as those used in connection with the current case 10'.

In particular, each dough package 15 is associated with four interstices 18 about its periphery. As can be seen from FIG. 4, the orifices are so positioned in the top wall 20 that at least two of the interstices adjacent each dough package would be associated with an orifice 30 in the top wall. As a matter of fact, of the 24 dough packages in the case illustrated in FIG. 4, 16 of the cans have at least one orifice 30 or finger hole 30' associated with each of the four interstices surrounding the package. Additionally, each of the remaining eight packages that have only two or three of their adjacent interstices associated with an orifice 30 in the top wall is positioned immediately adjacent the sidewall 22 of the case. As explained above, the dough packages adjacent the sidewall will tend to be heated by conduction of heat through the sidewalls. Accordingly, the fact that only two or three of the interstices around some peripherally positioned dough packages 15 are provided with an associated orifice will not cause much significant variation in the heating rate of the dough in these packages as compared to the rest of the packages in the case.

A case 10 of the invention is not only intended for use in the proofing process (explain more fully below), but is also intended to package the dough products for shipping from the manufacturing facility to another destination, such as a grocery store. Accordingly, the case 10 must be capable of withstanding normal stresses associated with shipping and handling of dough products. If the orifices through the top wall were too numerous or too large, they would reduce the structural strength of the top wall and may render the case 10 unable to withstand the rigors of shipping and handling. Accordingly, it is important to minimize the percentage of the surface area of these orifices that is occluded by the dough packages. By minimizing the occlusion of the orifices, the effectiveness of the orifices as a function of their surface area is maximized.

Accordingly, in the embodiment shown in FIGS. 3 and 4 the side orifices 32 in the top wall are made somewhat smaller than the rest of the orifices. These side orifices are associated with smaller interstices than those present in the rest of the package—these interstices are bounded by two dough packages on one side and the flat side wall 22 on the other and therefore are smaller than the interstices toward the center of the case. Accordingly, the position and size of these orifices should not effectively reduce the efficiency with which these interstices are heated as compared to the other interstices of the case.

It is preferred that the percentage of the surface area of the orifices occluded by the dough packages be no more than about seventy percent. In the embodiment shown in FIGS. 2–4, only about one-third (36%) of the surface area of the orifices 30,32 is occluded by a dough package 15. "Occlusion" as used herein simply means that an end of a generally cylindrical dough package is positioned immediately below the opening of the orifice; it should be understood that there may be some spacing between the end of the dough package and the top wall which may nonetheless permit some air to enter the case through the "occluded" portion of the orifice.

It is also desirable that the surface area of the orifices be no greater than about 35 percent of the total surface area of the top wall 20, including the orifices. If the top wall 20 is made of cardboard or a material having similar structural properties, as are most cases in the dough products industry, increasing the percentage of the surface area of the top wall much beyond this point will tend to significantly weaken the case 10, which could lead to unacceptable product losses during shipping and handling. In the embodiment shown in FIGS. 2–4, the orifices 30, 32 comprise approximately 15 percent of the total surface area of the top wall 20.

As explained previously, the bottom wall (not shown) of a case 10 of the invention is also provided with orifices and these orifices are configured in substantially the same way as the orifices 30 and the top wall 20. The orifices 30 in the top wall are in substantial alignment with the orifices in the bottom wall, i.e., pairs of orifices are aligned along a line drawn generally perpendicularly to both the top and bottom walls of the case. These paired orifices define a preferred path of air flow through the case. Since these orifices are aligned generally perpendicularly to the top and bottom walls of the case, this will permit air flow to be established within the case, as explained more fully below.

Figure 5:
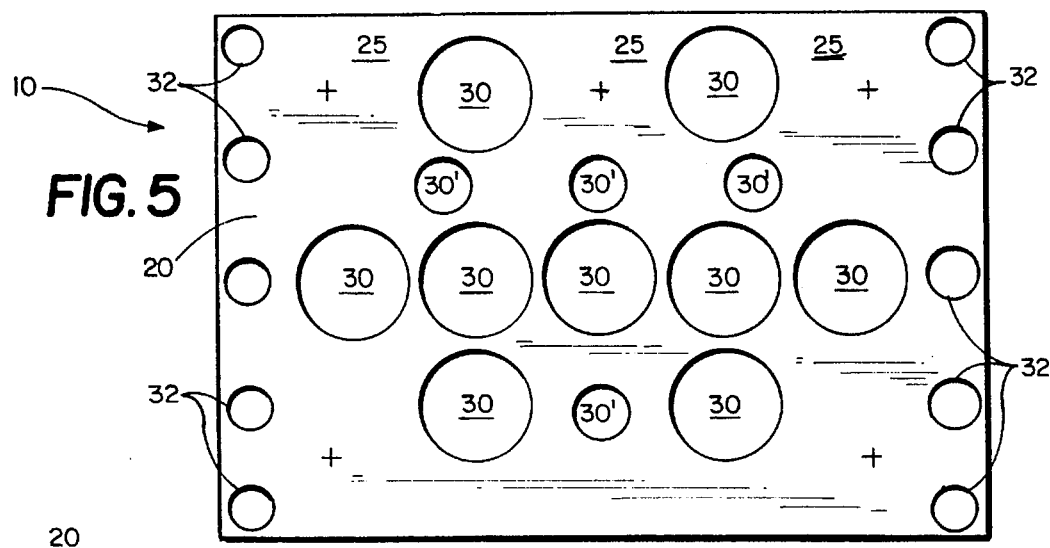
FIG. 5 is a top isolational view of a case for packaged dough products in accordance with an alternative embodiment of the invention.

FIG. 5 shows a top view of an alternative embodiment of a case 10 of the invention. In this embodiment, the size and position of the side orifices 32 and the finger holes 30' remains substantially the same as in the embodiment shown in FIGS. 2–4. Whereas the orifices 30 in FIGS. 2–4, are no larger than the interstices between the dough packages 15, though, the orifices 30 in the embodiment shown in FIG. 5 are substantially larger. Nonetheless, the position of these orifices is adapted to coincide insofar as possible with the position of the interstices 18 between adjacent dough packages.

The percentage of the total surface area of the orifices 30, 32 which is "occluded" by a dough package 15 in this embodiment is only about 35 percent. Although this is somewhat greater than the percentage of the orifices' surface area occluded in the embodiment shown in FIGS. 2–4, the orifices in the case of FIG. 5 will still significantly increase the flow of air through the case without greatly diminishing the strength of the top wall 20. The orifices in this embodiment comprise a total of about 15 percent of the total surface area of the top wall 20, which substantially coincides with the same percentage for the embodiment shown in FIGS. 2–4.

As in the previous embodiment of the invention, the bottom wall (not shown) of the embodiment of FIG. 5 has orifices configured in substantially the same way as those in the top wall 20. Since these orifices are generally associated with the interstices between adjacent dough packages within the case 10, the alignment of the orifices between the top and bottom walls will permit a laminar flow of air through the case 10 to be established.

Figure 6:
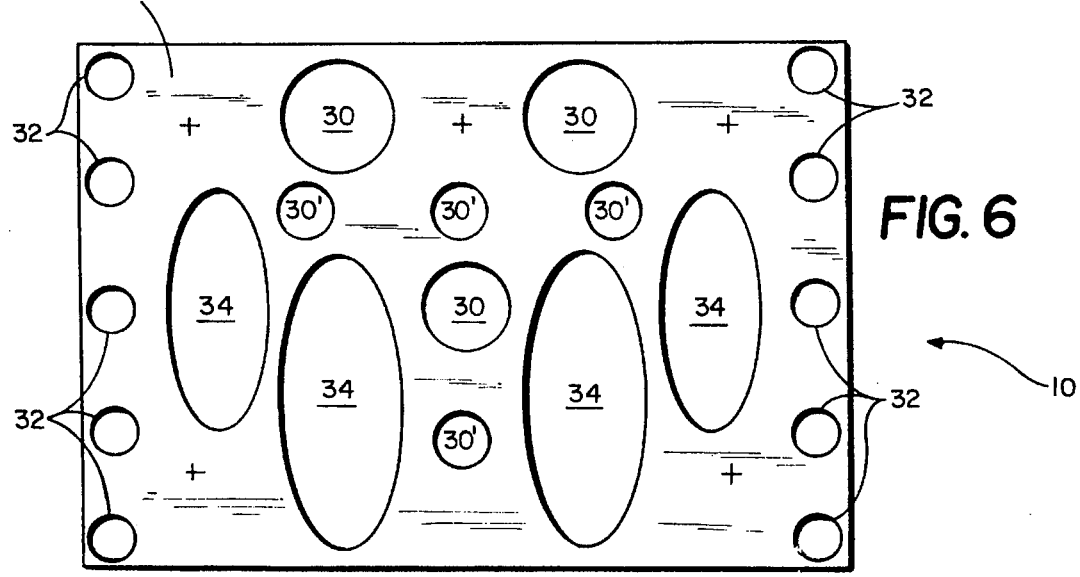
FIG. 6 is a top isolational view of a case for packaged dough products in accordance with an another embodiment of the invention.

FIG. 6 shows another alternative embodiment of a case 10 in accordance with the present invention. Once again, the position and size of the finger holes 30' and the side orifices 32 remain substantially the same. In this embodiment, though, the remainder of the orifices are not all equally sized. In particular, three of these orifices, designated 30 in FIG. 6, are substantially circular in shape and may all be of approximately the same size. This embodiment includes four additional orifices, designated 34 in FIG. 6, which are significantly larger than the rest of the orifices 30, 30' and 32. These orifices 34 are generally ellipsoid in shape, having a major axis which is substantially vertical and a minor axis which is substantially horizontal in the orientation shown in FIG. 6.

Once again, all of the orifices are sized and shaped to maximize the percentage of the surface area of the orifices unoccluded by dough packages within the case 10. In this embodiment, approximately sixty-five percent of the surface area of all of the orifices 30, 32 and 34 is occluded by the dough packages within the container. Additionally, the total surface area of the orifices is approximately 32 percent of the total surface area of the top wall 20. As in the other embodiments of the invention, the bottom wall will have orifices which are similarly sized and positioned to provide perpendicularly aligned orifices between the top and bottom walls so that laminar air flow through the case may be established.

The present invention also contemplates a method of proofing dough utilizing a case 10 in accordance with the previous embodiments of the invention. First, such a case 10 will be provided and substantially unleavened packaged dough products 15 will be placed within the cases. These dough packages should be positioned within the case so that the dough packages will abut one another to conserve space within the case 10. So packing the dough packages 15 within the case will cause the sidewalls of the generally cylindrical dough packages to define interstices 18 between the packages. The case may then be finally assembled with the dough packages within the interior of the case.

This case of packaged dough products may then be placed into a heating chamber. The temperature maintained in this heating chamber is desirably between about 100° F. and about 140° F., with a temperature of approximately 120° F. being preferred. It is preferred that the heat within this chamber be supplied by a flow of heated air, which may be supplied as a turbulent flow of air. Alternatively, the air may be directed through the chamber substantially vertically either downwardly or upwardly; if so desired, this vertical air flow may be generally laminar. A wide variety of industrial ovens adapted to provide a turbulent or vertical flow of heated air at the specified temperatures are commercially available and such chambers need not be discussed in any further detail here.

As noted above, pairs of orifices in the top and bottom walls of a case 10 of the invention are substantially vertically aligned with one another. Since these orifices are positioned generally above and below the interstices between the dough packages within the case, the hot air supplied in the heating chamber can pass along the preferred path of air flow defined by these pairs of orifices. If heat within the heating chamber is supplied by a flow of heated air, the air will tend to flow through the pairs of orifices. This will essentially establish laminar air flow through the interior of the case between the paired orifices of the top and bottom walls. Depending on the velocity of the heated air, if the heated air is supplied in a laminar flow pattern the flow of air through the case can be generally laminar as well. Since the orifices are relatively uniformly distributed across the surface area of the top and bottom walls, the flow of heated air through the interior of the case will tend to quickly and substantially uniformly heat the dough within the packages in the case to the desired temperature.

Once the dough within the dough packages has been heated to the desired temperature, it generally must be held at that temperature for a sufficient time for the dough to leaven a specified amount. The length of the heat treatment in this heating chamber will vary somewhat from one product to another. The exact time of this heat treatment must therefore be determined on a case-by-case basis.

In the preferred embodiment wherein the dough is heated with air supplied at about 120° F., the outer portion of dough within a given package 15 will reach or exceed the target temperature of 95° F. before the dough at the center of the package. It is not necessary to wait until the temperature of the dough in the packages reaches equilibrium before the dough is removed from the heating chamber, though. If the heated case of dough is removed when the outer layers of the dough in a package is warmer than 95° F. but the inner portion of the dough is cooler than that target temperature, the dough can nonetheless reach equilibrium of 95° F. Accordingly, an alternative way of stating the temperature parameters above is to specify that a certain amount of heat must be transferred to each dough package to sufficiently leaven the dough rather than phrasing the parameters in terms of target temperature.

Once the dough has been sufficiently heat treated in the heating chamber, the case 10 may be removed from the heating chamber and the dough products may be allowed to cool. If so desired, the cases may simply be removed from the heating chamber and placed in a temperature-controlled storage area which is maintained at refrigeration temperatures. In one preferred embodiment, the cases are simply stacked in a storage area which is maintained at between about 38° and 40° F.

The orifices in the top and bottom walls of the case of the invention will permit the dough packages to cool significantly more rapidly than if the cases were substantially entirely enclosed, as in the case of the current cases 10' of FIG. 1. Also, the relatively uniform distribution of the orifices across the surfaces of the top and bottom walls will ensure that the rate of cooling is fairly uniform regardless of the position of the dough package within the case. In prior art proofing methods, the dough packages adjacent the sidewalls of a case would tend to cool much more rapidly than those spaced away from the sidewalls. The rate of cooling of the dough packages in a case 10 of the invention, though, does not significantly depend upon the position of the dough package within the case.

In an alternative embodiment, the heated cases 10 are not simply allowed to stand in a cold storage area. Instead, the heated cases are moved into a cooling chamber which is adapted to cool the dough more quickly. Although it is preferred that the cases be moved directly from the heating chamber to the cooling chamber, this is not necessary. If production schedules dictate that the cases must be stored temporarily in the cooled storage area noted above prior to entering the cooling chamber, this should not adversely affect the quality of the dough products.

The cooling chamber in accordance with this embodiment of the invention desirably utilizes a flow of air maintained at the desired cooling temperature, which may be in the neighborhood of about 20°–38° F., with a temperature of between about 20° F. and about 25° F. being preferred. As in the case of the heating chamber described above, the vertical air flow through the cooling chamber will establish a flow of air through at least a portion of the interior of the case. This air flow through the case will cool the dough within the packages 15 at a significantly higher rate than if the cases were simply allowed to stand in a cooled environment.

The method of the present invention yields surprising time savings in the dough manufacturing process. As noted above, cases of dough stored in a case 10' such as that shown in FIG. 1 generally must be held in a heating chamber maintained at about 95° F. for at least 50 minutes, and up to two hours, depending upon the product being proofed, the number of cases arranged on the pallet, and how many cases are stacked one atop another. When these cases of heat treated dough are simply allowed to stand in a warehouse maintained at 38°–40° F., the cases take about two full days to cool below about 50°–55° F., where the leavening action substantially ceases, and up to a week to fully cool down to the ambient temperature within the warehouse.

Proofing and cooling dough in accordance with the present invention, though, takes significantly less time. As noted above, it is contemplated that the dough will be heated with air maintained at about 120° F. in the method of the invention, in contrast to the 95° F. environment currently utilized. Heating dough in cases 10' such as that shown in FIG. 1 stacked on pallets at temperatures approaching 120° F. would lead to a very prominent difference in heat treatment for different packages of dough, depending on the position of the dough on the pallet. The present invention, though, permits higher temperatures to be used because all of the dough is heated relatively uniformly. Heating at a higher temperature will obviously permit heat to be transferred to the product more quickly, reducing the time necessary to reach the desired heating of the dough. Whereas it currently takes about 50 minutes to two hours to proof dough, it is anticipated that dough may be proofed to the same degree in accordance with the present invention in only about 30–60 minutes, roughly cutting the proofing time in half.

Cooling proofed doughs in accordance with the invention will also result in great time savings. It is currently believed that cooling an entire pallet of dough packages down to about 50°–55° F., thereby substantially halting leavening of the dough, in accordance with the present invention will take no more than about two hours. The dough may then be moved to a storage area such as that currently used to cool the dough down to refrigeration temperatures for extended storage. This is clearly shorter than the two days necessary to cool the dough sufficiently to arrest leavening in the prior art method. This major reduction in cooling time will permit more precise and accurate control of the heat treatment of dough products, and hence quality of the dough being produced.

One other advantage of the method of the invention is that it permits cases 10 of the invention to be stacks on pallets without significantly increasing or decreasing the time necessary to heat treat the dough products contained therein. In present manufacturing processes, arranging cases 10' of packaged dough products on pallets will also increase the time necessary to fully heat treat the doughs and yield even greater variability in proofing conditions depending on the physical location of a particular dough package on the pallet. If the cases 10' are stacked on top of one another on the pallet during either the heating or cooling process, this can further exacerbate these problems.

In accordance with the present invention, cases of dough products can be arranged on pallets without significantly increasing the heating or cooling times because the carefully sized and positioned orifices 30, 32 and 34 will ensure that the dough within the cases is relatively quickly and uniformly heated and cooled. This is true even if cases are stacked on top of one another, either by directly resting cases one atop another or by stacking pallets on top of one another. In order to ensure that air flow is established in at least a portion of each case, it is preferred that aligned pairs of orifices in the top and bottom walls of one case be generally aligned with the corresponding pair of orifices in the case below. By aligning orifices in different cases, the air flow through the cases may be established; if the cases were not so aligned, this may disrupt air flow and unevenly heat the cases on the pallet. Aligning the orifices can also be helpful in circumstances conducive to establishing laminar airflow through the cases in that misalignment would disrupt this air flow.

The cases may be stacked on a pallet in any manner which ensures that the orifices of cases stacked atop one another are in substantial alignment. For instance, it may be possible to carefully arrange the configuration of cases on a pallet so that the cases may be oriented differently on different tiers of the stack with the orientation of the cases differing from one tier to the next. Alternatively, the cases may be arranged in the same configuration on each tier so that the cases will maintain the same orientation from one tier to the next. This will create vertical columns of cases rather than the interlocking arrangement commonly utilized in stacking cases on pallets, which is not unlike the arrangement of bricks in a wall or the like. Such a series of vertical columns will tend to be less stable than an interlocking formation, so additional steps may be necessary to ensure stability of the cases on the pallet. These additional steps may, for instance, include shrink wrapping a plastic material about the exterior of an arrangement of cases on a pallet or using an adhesive material to lightly bond the cases together.

While a preferred embodiment of the present invention has been described, it should be understood that various changes, adaptations and modifications may be made therein without departing from the spirit of the invention and the scope of the appended claims.

What is claimed is:

1. A method of proofing packaged dough comprising the steps of:
    a) providing a case having a top wall, a sidewall and a bottom wall together defining an interior of the case, the top wall and bottom wall including a plurality of orifices, the orifices in the top wall being in substantial alignment with the orifices in the bottom wall;
    b) placing a plurality of generally cylindrically-shaped packages containing substantially unproofed, unbaked dough in the interior of the case such that the packages are oriented generally perpendicular to the top and bottom walls and the packages abut one another to define interstices between the packages in the interior of the case; and
    c) placing said case containing packages of dough in a heating chamber and directing heated air into contact with said case to establish a flow of air through at least a portion of the interior of the case to substantially uniformly heat all of the packages of dough in the case;
    d) heat treating the case containing packages of dough in said heating chamber for a predetermined period of time; and
    e) cooling said case containing packages of dough to refrigeration temperatures.

2. The method of claim 1 wherein the dough is cooled by placing said case in a cooling chamber and directing cooled air into contact with said case to establish a flow of air through at least a portion of the interior of the case to substantially uniformly cool all of the packages of dough in the case.

3. The method of claim 1 wherein a plurality of said cases are arranged on a pallet before placing the cases in the heating chamber.

4. The method of claim 1, wherein the substantially aligned orifices in the case deride a plurality of pairs of aligned orifices, each pair having an orifice in the top wall in substantial alignment with a corresponding orifice in the bottom wall defining a preferred path for air flow through the case, and each pair being in substantial alignment with an interstice between the dough packages, and passing heated or cooled gas along the preferred paths to enhance heat transfer to the dough packages.

* * * * *